United States Patent
Joshi et al.

(10) Patent No.: US 9,910,413 B2
(45) Date of Patent: Mar. 6, 2018

(54) AUTOMATIC TUNING CONTROL SYSTEM FOR AIR POLLUTION CONTROL SYSTEMS

(71) Applicant: ALSTOM Technology Ltd, Baden (CH)

(72) Inventors: Abhinaya Joshi, Glastonbury, CT (US); John M. Peluso, Belmont, WV (US); Shu Zhang, Windsor Locks, CT (US); Xinsheng Lou, West Hartford, CT (US)

(73) Assignee: General Electric Technology GmbH, Baden (CH)

( * ) Notice: Subject to any disclaimer, the term of this patent is extended or adjusted under 35 U.S.C. 154(b) by 529 days.

(21) Appl. No.: 14/022,873

(22) Filed: Sep. 10, 2013

(65) Prior Publication Data
US 2015/0073572 A1 Mar. 12, 2015

(51) Int. Cl.
*G05B 13/04* (2006.01)
*B01D 53/34* (2006.01)
(Continued)

(52) U.S. Cl.
CPC ......... *G05B 13/042* (2013.01); *B01D 53/346* (2013.01); *B01D 53/505* (2013.01);
(Continued)

(58) Field of Classification Search
CPC .... G05B 13/042; F23J 15/006; B01D 53/346; B01D 53/505; B01D 2251/602;
(Continued)

(56) References Cited

U.S. PATENT DOCUMENTS

| 4,836,991 A | 6/1989 | Ishiguro et al. |
| 5,212,765 A * | 5/1993 | Skeirik ............... G05B 13/027 417/44.2 |

(Continued)

FOREIGN PATENT DOCUMENTS

| EP | 1382905 A1 | 1/2004 |
| EP | 1815903 A1 | 8/2007 |

(Continued)

OTHER PUBLICATIONS

Yukitomo et al., "A new PID controller tuning system and its application to a flue gas temperature control in a gas turbine power plant", Sep. 1-4, 1998, Proceedings of the 1998 IEEE, International conference on Control applications, pp. 1373-1377.*

(Continued)

*Primary Examiner* — Jason Lin
(74) *Attorney, Agent, or Firm* — GE Global Patent Operation; Rita D. Vacca

(57) ABSTRACT

An automatic tuning control system and method for controlling air pollution control systems such as a dry flue gas desulfurization system is described. The automatic tuning control system includes one or more PID controls and one or more supervisory MPC controller layers. The supervisory MPC controller layers are operable for control of an air pollution control system and operable for automatic tuning of the air pollution control systems using particle swarm optimization through simulation using one or more dynamic models, and through control system tuning of each of the PID controls, MPC controller layers and an integrated MPC/PID control design.

15 Claims, 4 Drawing Sheets

(51) Int. Cl.
 *B01D 53/50* (2006.01)
 *F23J 15/00* (2006.01)
 *B01D 53/68* (2006.01)

(52) U.S. Cl.
 CPC .............. *F23J 15/006* (2013.01); *B01D 53/68* (2013.01); *B01D 2251/404* (2013.01); *B01D 2251/602* (2013.01); *B01D 2251/604* (2013.01); *B01D 2257/2045* (2013.01); *B01D 2257/302* (2013.01); *B01D 2258/0283* (2013.01); *F23J 2215/10* (2013.01); *F23J 2215/20* (2013.01); *F23J 2217/102* (2013.01); *F23J 2219/10* (2013.01); *F23J 2219/20* (2013.01); *F23J 2219/40* (2013.01); *F23J 2219/60* (2013.01); *F23J 2900/15041* (2013.01)

(58) Field of Classification Search
 CPC .............. B01D 53/68; B01D 2257/302; B01D 2251/604; B01D 2257/2045; B01D 2258/0283; B01D 2251/404
 USPC .......................................................... 700/29
 See application file for complete search history.

(56) References Cited

U.S. PATENT DOCUMENTS

| | | | |
|---|---|---|---|
| 5,386,373 A | 6/1995 | Keeler et al. | |
| 5,770,161 A | 6/1998 | Ochi et al. | |
| 5,873,251 A | 2/1999 | Iino | |
| 6,168,709 B1 | 1/2001 | Etter | |
| 6,985,779 B2 * | 1/2006 | Hsiung | G05B 15/02 700/17 |
| 7,371,357 B2 * | 5/2008 | Magumbe | B01D 53/229 423/210 |
| 2003/0195665 A1 * | 10/2003 | Cutler | G05B 13/048 700/266 |
| 2004/0102890 A1 | 5/2004 | Brunell | |
| 2005/0238549 A1 * | 10/2005 | Hammel | C22B 7/006 422/168 |
| 2005/0265417 A1 * | 12/2005 | Fallon | H01S 3/097 372/55 |
| 2006/0045801 A1 | 3/2006 | Boyden et al. | |
| 2006/0153761 A1 | 7/2006 | Bandl-Konrad et al. | |
| 2009/0319060 A1 * | 12/2009 | Wojsznis | G05B 11/42 700/30 |

FOREIGN PATENT DOCUMENTS

| | | |
|---|---|---|
| JP | 53-109897 | 9/1978 |
| JP | 63-294927 | 12/1988 |
| JP | 8-234802 | 9/1996 |
| JP | 8-309140 | 11/1996 |
| JP | 9-29057 | 2/1997 |
| JP | 10-66825 | 3/1998 |
| JP | 2001-249705 | 9/2001 |
| JP | 2003-144852 | 5/2003 |
| JP | 2003-323201 A | 11/2003 |
| WO | 2004/061278 A1 | 7/2004 |

OTHER PUBLICATIONS

Aguilar et al., "Temperature control in catalytic cracking reactor via a robust PID controller", Aug. 3, 2000, Elsevier, Journal of Process Control 12, pp. 695-705.*

Gambier et al., "A NEw Approach to Design Multi-loop Control Systems with Multiple Controllers", Dec. 13-15, 2006, Proceedings of the 45th IEEE Conference on Decision & Control, pp. 1828-1833.*

Article "Instrument Fault Detection and Isolation: State of the Art and New Research Trends" Giovanni Betta et al; IEEE Transactions on Instrumentation and Measurement, vol. 49, No. 1, Feb. 2000, pp. 100-108.

Kawai F. et al. "Automatic tuning for Model Predictive Control: Can Particle Swarm Optimization find a better parameter?", Intelligent Control, 2007, ISIC 2007. IEEE 22$^{nd}$ International Symposium on, IEEE, PI, Oct. 1, 2007 (Oct. 1, 2007), pp. 646-651.

Kwang Y Lee et al.: Controller Design for a Large-Scale Ultrasupercritical Once-Through Boiler Power Plant, IEEE Transactionson Energy Conversation, IEEE Service Center, Piscataway, NJ, US, vol. 25, No. 1 Dec. 1, 2010 (Dec. 1, 2010), pp. 1063-1070.

J.S. Heo et al.: "Multiobjective Control of Power Plants Using Particle Swarm Optimization techniques", IEEE Transactions on Energy Conversion, vol. 21, No. 2, Jun. 1, 2006 (Jun. 1, 2006), pp. 552-561.

* cited by examiner

US 9,910,413 B2

AUTOMATIC TUNING CONTROL SYSTEM FOR AIR POLLUTION CONTROL SYSTEMS

FIELD OF THE INVENTION

The present disclosure relates generally to an automatic tuning control system for air pollution control systems. More particularly, the present disclosure relates to an automatic tuning control system for air pollution control systems, such as but not limited to dry flue gas desulfurization (DFGD) systems, wet flue gas desulfurization (WFGD) systems, sea water flue gas desulfurization (SWFGD) systems, nitrogen oxide removal via selective catalytic reduction (SCR) systems or selective non-catalytic reduction (SNCR) systems, and particulate removal via electro-static precipitation (ESP) systems.

BACKGROUND OF THE INVENTION

Combustion of a fuel such as coal, oil, peat, waste, or the like, in a combustion plant such as a fossil power plant or a waste incineration plant, generates a hot process gas or "flue gas" containing among other components, gaseous pollutants, such as hydrogen chloride (HCl) and sulphur oxides ($SO_X$), such as sulphur dioxide ($SO_2$). It is normally necessary to remove at least a portion of the gaseous pollutants from the flue gas before releasing the flue gas into the atmosphere.

Separating gaseous pollutants such as hydrochloric acid and sulphur dioxide from flue gas is frequently accomplished using a DFGD system wherein a lime-containing absorbent material is introduced into the flue gas to react with the gaseous pollutants. When this lime-containing absorbent material reacts with the gaseous pollutants, the gaseous pollutants are converted chemically or physically into dust or particulate material, which is then separated in a filter. EP 1 815 903 A1 discloses an example of such a method, wherein a lime-containing dust is mixed with water in a mixer and then introduced into a contact reactor for reaction with flue gas gaseous pollutants. The dust or particulate material formed in the contact reactor is separated in a filter and recirculated to the mixer to be mixed again with water for subsequent introduction into the contact reactor.

Control of air pollution control systems, such as but not limited to DFGD systems such as that described above, WFGD systems, nitrogen oxide ($NO_X$) removal via SCR systems, and particulate removal via ESP systems may be achieved using a multivariable model predictive controller (MPC) and a proportional integral derivative (PID) controller as disclosed in U.S. Pat. Nos. 7,640,067; 7,698,004; 7,860,586; 7,862,771; and 8,197,753; each incorporated herein in its entirety by reference.

To date, control of air pollution control systems using MPC and PID controllers require manual tuning. Manual tuning of such systems is time consuming, relatively expensive, prone to human variation and limitations, and the like. An automatic tuning control system for air pollution control systems is thereby considered desirable, preferable and necessary.

SUMMARY OF THE INVENTION

An automatic tuning control system and process for air pollution control systems is disclosed herein. The subject automatic tuning control system and process is useful for air pollution control systems, such as but not limited to dry flue gas desulfurization (DFGD) systems, wet flue gas desulfurization (WFGD) systems, sea water flue gas desulfurization (SWFGD) systems, nitrogen oxide ($NO_X$) removal via selective catalytic reduction (SCR) systems or selective non-catalytic reduction (SNCR) systems, and particulate removal via electro-static precipitation (ESP) systems. The subject automatic tuning control system and method provides significant tuning effectiveness with significantly less time and manual effort.

The subject automatic tuning control system and process is equally applicable to DFGD systems, WFGD systems, SWFGD systems, $NO_X$ removal via SCR systems or SNCR systems, particulate removal via ESP systems, and the like. However, solely for purposes of simplicity and clarity, the subject automatic tuning control system and process is singularly described herein with regard to a DFGD system and process. As such, this DFGD system and process uses a hydrated lime-based spray dry absorber (SDA). Lime and water are mixed to form a lime slurry that is stored in a large storage tank. From the storage tank, the lime slurry is pumped to a relatively small head tank arranged above the reactor where water is further added to the lime slurry as necessary to simultaneously control the reactor outlet $SO_2$ level and flue gas temperature. To this end, three pipelines are each fluidly connected between a bottom of the head tank and separate atomizer sprayers each arranged within an interior of the reactor. Each of the three pipelines is also equipped with an individual control valve for regulation or control of the atomized spray of diluted lime slurry within the reactor interior. Within the reactor interior, the atomized diluted lime slurry reacts with flue gas pollutants for removal of the pollutants from the flue gas in the form of particulate matter to produce a "cleaned" flue gas (CG).

To ensure the so produced cleaned flue gas CG meets regulatory emission standards for release to the environment, the subject DFGD system also includes a control system comprising one or more, such as three according to the embodiment disclosed herein, proportional integral derivative (PID) controllers and a supervisory multivariable predictive control (MPC) controller layer. In accordance with the embodiment disclosed herein, the first PID controller receives a hardwire or an electrical signal from a temperature sensor arranged in a flue gas duct downstream of the SDA reactor. Information already programmed into or historically gathered and stored within first PID controller is a temperature set point corresponding to a desired temperature for flue gas flowing through the flue gas duct. Depending on whether the signal received by first PID controller from the temperature sensor is a temperature higher than the temperature set point, lower than the temperature set point, or equal to the temperature set point, the first PID controller sends a signal via hardwire or electronically to one or more control valves to increase slurry flow, decrease slurry flow, or maintain current slurry flow, respectively.

Similarly, the second PID controller receives a hardwire or an electrical signal from a $SO_2$ sensor arranged in a filter duct downstream of one or more baghouses. Information already programmed into or historically gathered and stored within second PID controller is a $SO_2$ emission set point corresponding to a desired $SO_2$ emission amount for flue gas flowing through the filter duct. Depending on whether the signal received by the second PID controller from the $SO_2$ sensor, is a $SO_2$ emission amount higher than the $SO_2$ emission set point, lower than the $SO_2$ emission set point, or equal to the $SO_2$ emission set point, the second PID controller sends a signal via hardwire or electronically to one or more control valves to decrease dilution water flow, increase dilution water flow, or maintain current dilution water flow, respectively.

Like the other PID controllers, the third PID controller receives a hardwire or an electrical signal from a slurry level sensor arranged in an interior of a head tank. Information already programmed into or historically gathered and stored within third PID controller is a slurry level set point corresponding to a desired slurry level within the head tank. Depending on whether the signal received by third PID controller from the slurry level sensor, indicates a slurry level within the head tank higher than the slurry level set point, lower than the slurry level set point, or equal to the slurry level set point, the third PID controller sends a signal via hardwire or electronically to one or more control valves to decrease slurry flow, increase slurry flow, or maintain current slurry flow, respectively.

In accordance with the embodiment disclosed herein for DFGD, the supervisory MPC controller layer uses a dynamic mathematical multivariable model representing the DFGD system and an optimization solver to calculate the optimal operating settings for multiple inputs to the DFGD system. The optimal operating settings calculated by the MPC controller layer for the DFGD system is based on a predefined objective and constraints encompassing finite time horizons in the future. There are two time horizons used in the subject MPC controller layer calculation: 1) a Control Horizon (CH) representing a time in the future up to which changes to the manipulated variables (MV), i.e., input variables that can be manipulated, is allowed; and 2) a Prediction Horizon (PH) representing a time in the future up to which the predicted DFGD system response as a result of changes made to MVs is included in the MPC controller layer calculation. The dynamic mathematical multivariable model used by the DFGD supervisory MPC controller layer has an input-output structure as illustrated in FIG. 2.

An automatic tuning control system for the described DFGD system uses particle swarm optimization (PSO). PSO is a stochastic optimization method based on the simulation of the social behavior of bird flocks or fish schools. The algorithm utilizes "swarm intelligence" to find the best place or position within a particular search space. As such, the subject automatic tuning control system for the described DFGD system operates using a two-step process. The first step of the process is to apply the automatic tuning control system in simulation using dynamic model(s), if available. The dynamic model mathematically represents the DFGD system behavior and can be based on first principles and/or DFGD system operating data. This step of simulation generates a set of initial tuning parameter values for use in the second step. The second step of the process is to perform automatic tuning of the actual or real, not simulated, DFGD system. DFGD system tuning is a three step process illustrated in FIG. 4, i.e., tuning of the PID controller(s), tuning of MPC controller layer, and tuning of the overall MPC/PID control system parameters simultaneously. For each of these three steps, objective functions are set differently, as described in detail below.

For the tuning of PID controller(s), the objective function is defined to simultaneously find the best set of control parameters for each PID controller to render optimal control performance based on for example, least set point error, fastest transient time, least overshoot, and like identified defined parameters.

Following the tuning of PID controller(s), a PSO based automatic tuning algorithm set forth in FIG. 3 is applied to a supervisory MPC controller layer to tune MPC objective weighting coefficients and varying prediction horizons PH and control horizons CH. As such, PSO pushes the supervisory MPC controller layer to maximize performance under certain identified defined DFGD system constraints, for example, least overall setpoint error among all the controlled variables (CV), i.e., variables that are controlled at a predefined setpoint, appropriate transient time for the whole DFGD system response, and the like.

After separate PID and MPC tuning, tuning of an integrated DFGD MPC/PID control design is conducted by the automatic tuning control system, in order to capture interaction not captured by separate PID and MPC tuning activities. The objective function is defined to incorporate the overall control performance requirements and a compromise between PID and MPC tuning performance, for example, least overall setpoint error among all the controlled variables (CV), appropriate transient time for the whole DFGD system response, and the like.

Using PSO, the PID controllers and the supervisory MPC controller layer may be simultaneously tuned to achieve improved system performance over like systems with manual tuning. Tuning using the PSO algorithm set forth in FIG. 3 provides the following advantages over manual tuning:

i) implementation requires only a few lines of computer code;
ii) the PSO search technique is based on values of an identified objective function, making use relatively easy;
iii) computationally relatively inexpensive as system computer memory and central processing unit (CPU) speed requirements are relatively low;
iv) set assumptions required for use of conventional deterministic methods such as linearity, differentiability, convexity, separability or non-existence of constraints for efficient problem solving are not required using the PSO search technique; and
v) search solutions do not depend on initial particle states as the PSO algorithm systematically navigates through the defined search space by using stochastic methods ensuing convergence to the optimal point.

In summary, the subject disclosure describes an automatic tuning control system for air pollution control systems comprising one or more, such as three, PID controls, and one or more supervisory MPC controller layers operable for control of an air pollution control system, operable for automatic tuning using particle swarm optimization through simulation using one or more dynamic models comprising ordinary and/or partial differential equations, and/or data driven regression, and/or neural networks operative to predict operational behavior of the air pollution control system, and operable for control system tuning of each PID controls, MPC controller layers and an integrated MPC/PID control design comprising an MPC controller layer operable to control emission amount and slurry level and to generate setpoints for lime slurry flow rate, dilution water flow rate, and reactor outlet temperature. As such, one PID control controls a flue gas temperature within an air pollution control system. Another PID control controls an emission amount within an air pollution control system. Still another PID control controls slurry level within an air pollution control system. Further, the supervisory MPC controller layer is operable to control each of the one or more PID controls. Automatic tuning of the subject air pollution control systems occurs with a frequency in the range of 1 second to 5 hours based on dynamic response time constants of relevant variables in the air pollution control system.

The subject disclosure likewise describes a method of using an automatic tuning control system for air pollution control systems comprising providing one or more, such as three, PID controls, and one or more supervisory MPC controller layers operable for control of an air pollution control system, operable for automatic tuning using particle swarm optimization through simulation using one or more dynamic models comprising ordinary and/or partial differential equations, and/or data driven regression, and/or neural networks operative to predict operational behavior of the air pollution control system, and operable for control system tuning of each PID controls, MPC controller layers and an integrated MPC/PID control design comprising an MPC controller layer operable to control emission amount and slurry level and to generate setpoints for lime slurry flow rate, dilution water flow rate, and reactor outlet temperature. In accordance with such method, one PID control controls a flue gas temperature within an air pollution control system. Another PID control controls an emission amount within an air pollution control system. Still another PID control controls slurry level within an air pollution control system. Further, the supervisory MPC controller layer is operable to control each of the one or more PID controls. Automatic tuning using the subject method occurs with a frequency in the range of 1 second to 5 hours based on dynamic response time constants of relevant variables in the air pollution control system.

Further objects and features of the subject automatic tuning control system and method for air pollution control systems and processes will be apparent from the following detailed description and claims.

BRIEF DESCRIPTION OF THE DRAWINGS

The subject automatic tuning control system for air pollution control systems will now be described in more detail with reference to the appended drawings described below.

DETAILED DESCRIPTION

An automatic tuning control system and method for controlling air pollution control systems is disclosed herein. The subject automatic tuning control system and method is useful for controlling air pollution control systems, such as but not limited to dry flue gas desulfurization (DFGD) systems, wet flue gas desulfurization (WFGD) systems, sea water flue gas desulfurization (SWFGD) systems, nitrogen oxide removal via selective catalytic reduction (SCR) systems or selective non-catalytic reduction (SNCR) systems, particulate removal via electro-static precipitation (ESP) systems, and the like. Use of the subject automatic tuning control system and method provides significant tuning effectiveness with significantly less time and effort.

While the subject automatic tuning control system and method is useful in controlling DFGD systems, WFGD systems, nitrogen oxide removal via SCR systems, particulate removal via ESP systems, and the like, for purposes of simplicity and clarity, the subject automatic tuning control system and process is described and exemplified herein with regard to a DFGD system and process.

Figure 1:
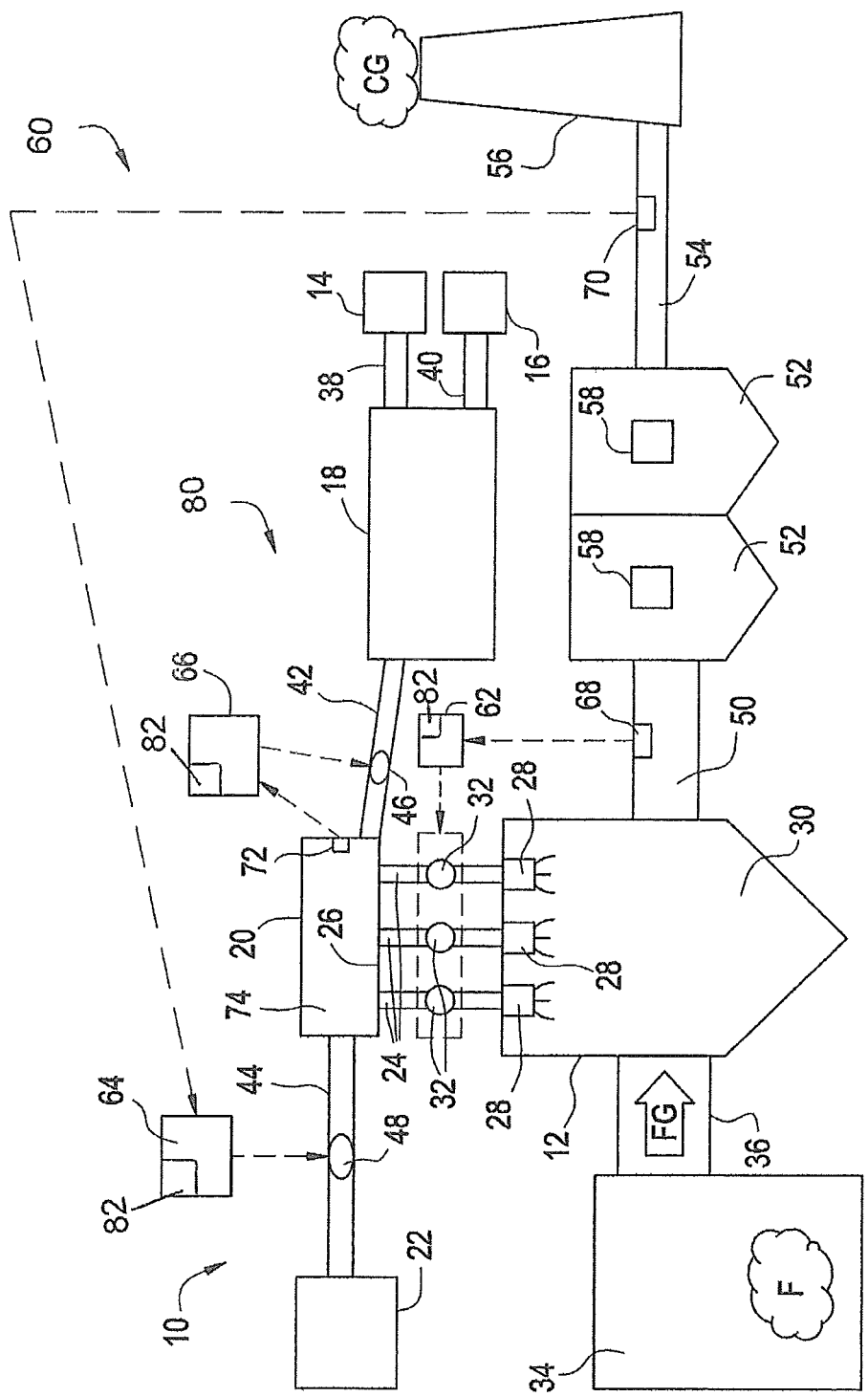
FIG. 1 is a schematic diagram of a dry flue gas desulfurization (DFGD) air pollution control system equipped with a control system.

Illustrated in FIG. 1 is a DFGD system 10. Fuel F combusted in boiler 34 produces a flue gas FG comprising atmospheric pollutants such as $SO_2$, HCl, and like acid gases. Flue gas FG flows out from boiler 34 through a fluidly connected duct 36, fluidly connected to a hydrated lime-based spray dry absorber (SDA) reactor 12. Lime through a fluidly connected duct 38 from a lime supply 14 and water through a fluidly connected duct 40 from a water supply 16 are mixed to form a lime slurry in storage tank 18. The lime slurry is pumped through a fluidly connected lime slurry duct 42 from storage tank 18 to a relatively small head tank 20 arranged above the SDA reactor 12. Dilution water through a fluidly connected dilution water duct 44 from a water supply 22 is further added to the lime slurry in head tank 20 as necessary to simultaneously control reactor outlet $SO_2$ level and flue gas temperature, as described in further detail below. Three pipelines 24 are each fluidly connected between a bottom 26 of head tank 20 and an atomizer sprayer 28 within an interior 30 of the SDA reactor 12. Each of the three pipelines 24 is equipped with an individual control valve 32 for control or regulation of diluted lime slurry spray and atomization within the SDA reactor 12 interior 30. Likewise, lime slurry duct 42 and dilution water duct 44 are each equipped with an individual control valve, 46 and 48, respectively.

Flue gas FG flowing from duct 36 into SDA reactor 12 contacts lime slurry sprayed and atomized by atomizer sprayers 28. Acid gases, such as $SO_2$ and HCl, of flue gas FG react with the lime slurry forming particulates entrained in the flue gas FG flowing from SDA reactor 12 through fluidly connected duct 50 to one or more bag houses 52. Within the one or more bag houses 52, particulates entrained within the flue gas FG are captured by filters 58. From the one or more bag houses 52, the flue gas FG flows through fluidly connected duct 54 to a fluidly connected stack 56 for release of cleaned flue gas CG to the environment.

To ensure cleaned flue gas CG meets regulatory emission standards for release to the environment, DFGD system 10 also includes a control system 60 comprising three proportional integral derivative (PID) controllers 62, 64 and 66. The first PID controller 62 receives a hardwire or an electrical signal from a temperature sensor 68 arranged in duct 50 downstream of SDA reactor 12. Information already programmed into or historically stored within first PID controller 62 is a temperature set point corresponding to a desired temperature for flue gas flowing through duct 50. Depending on whether the signal received by first PID controller 62 from temperature sensor 68, is a temperature higher than the temperature set point, lower than the temperature set point, or equal to the temperature set point, first PID controller 62 sends a signal via hardwire or electronically to one or more control valves 32 to increase slurry flow, decrease slurry flow, or maintain current slurry flow, respectively.

Similarly, the second PID controller 64 receives a hardwire or an electrical signal from a $SO_2$ sensor 70 arranged in duct 54 downstream of baghouses 52. Information already programmed into or historically stored within second PID controller 62 is a $SO_2$ emission set point corresponding to a desired $SO_2$ emission amount for flue gas flowing through duct 54. Depending on whether the signal received by second PID controller 64 from $SO_2$ sensor 70, is a $SO_2$ emission amount higher than the $SO_2$ emission set point, lower than the $SO_2$ emission set point, or equal to the $SO_2$ emission set point, second PID controller 64 sends a signal via hardwire or electronically to one or more control valves 48 to decrease dilution water flow, increase dilution water flow, or maintain current dilution water flow, respectively.

Like the other PID controllers, the third PID controller 66 receives a hardwire or an electrical signal from a slurry level sensor 72 arranged in interior 74 of head tank 20. Information already programmed into or historically stored within third PID controller 66 is a slurry level set point corresponding to a desired slurry level within head tank 20. Depending on whether the signal received by third PID controller 66 from slurry level sensor 72, indicates a slurry level within header tank 20 higher than the slurry level set point, lower than the slurry level set point, or equal to the slurry level set point, third PID controller 66 sends a signal via hardwire or electronically to one or more control valves 46 to decrease slurry flow, increase slurry flow, or maintain current slurry flow, respectively.

Figure 4:
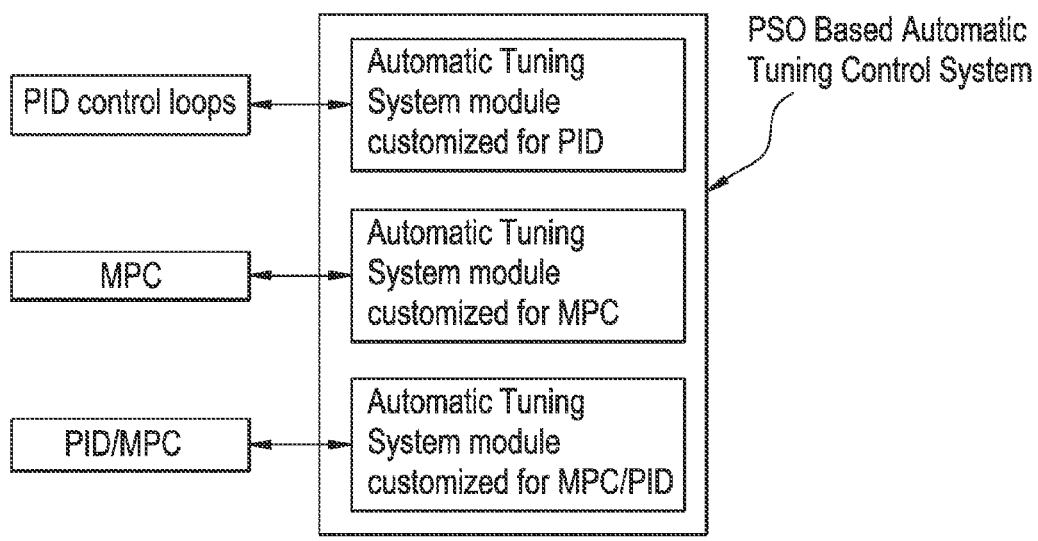
FIG. 4 is a schematic diagram depicting the three steps of the control system PSO automatic tuning process.

An automatic tuning control system 80 for DFGD system 10 uses particle swarm optimization (PSO). PSO is a stochastic optimization method based on the simulation of the social behavior of bird flocks or fish schools. The algorithm utilizes "swarm intelligence" to find the best place or position within a particular search space. As such, the subject automatic tuning control system 80 for DFGD system 10 operates using a two-step process. The first step of the process is to conduct automatic tuning in simulation using dynamic model(s), if available. The dynamic model mathematically represents the DFGD system behavior and can be based on first principles and/or DFGD system operating data. This step of simulation generates a set of initial tuning parameter values uses in the second step. The second step of the process is to perform automatic tuning of the real or actual, not simulated, DFGD system 10. The automatic tuning of the DFGD system 10 entails three tasks as illustrated in FIG. 4, i.e., tuning of the PID controller(s), tuning of multivariable predictive control (MPC) controller(s), and tuning of the overall MPC/PID control system parameters simultaneously. For each of these three tasks, objective functions need to be set differently, as described in detail below.

Figure 2:
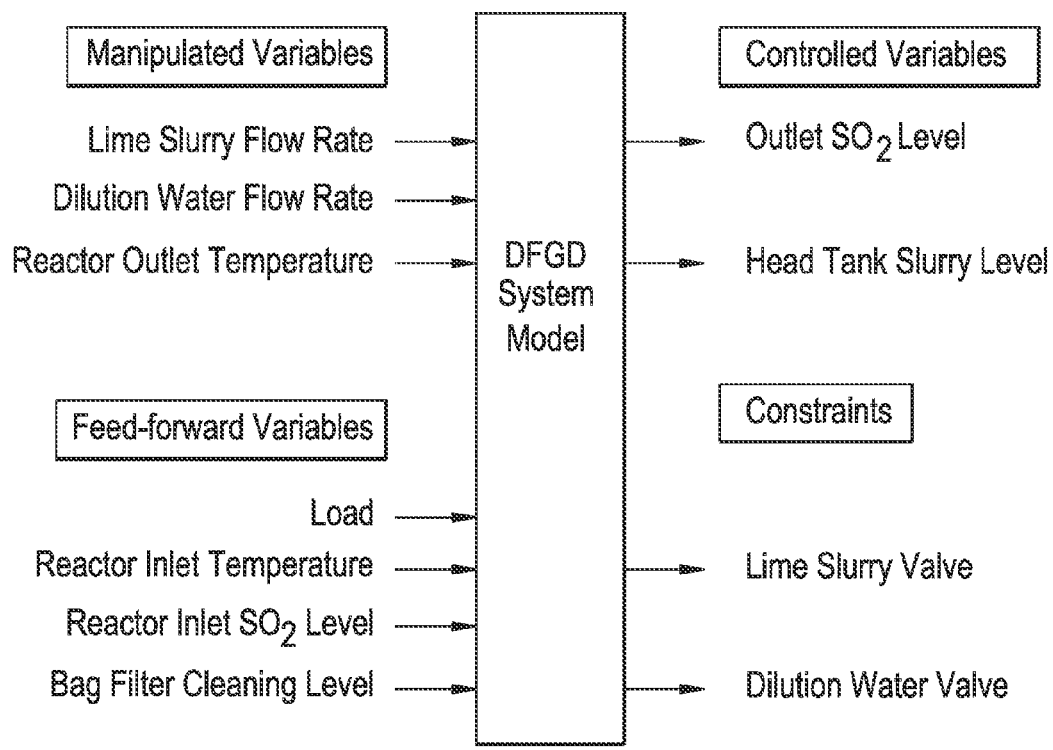
FIG. 2 is a schematic diagram of the input-output structure of the dynamic mathematical multivariable model internal to the MPC controller layer for air pollution control systems as applied to the system of FIG. 1.

For the tuning of PID controller(s), the objective function is defined to simultaneously find the best set of control parameters for each PID controller to render optimal control performance based on for example, least set point error, fastest transient time, least overshoot, and the like identified parameters, for PID controller regulation based on the DFGD system 10 model structure set forth in FIG. 2.

Figure 3:
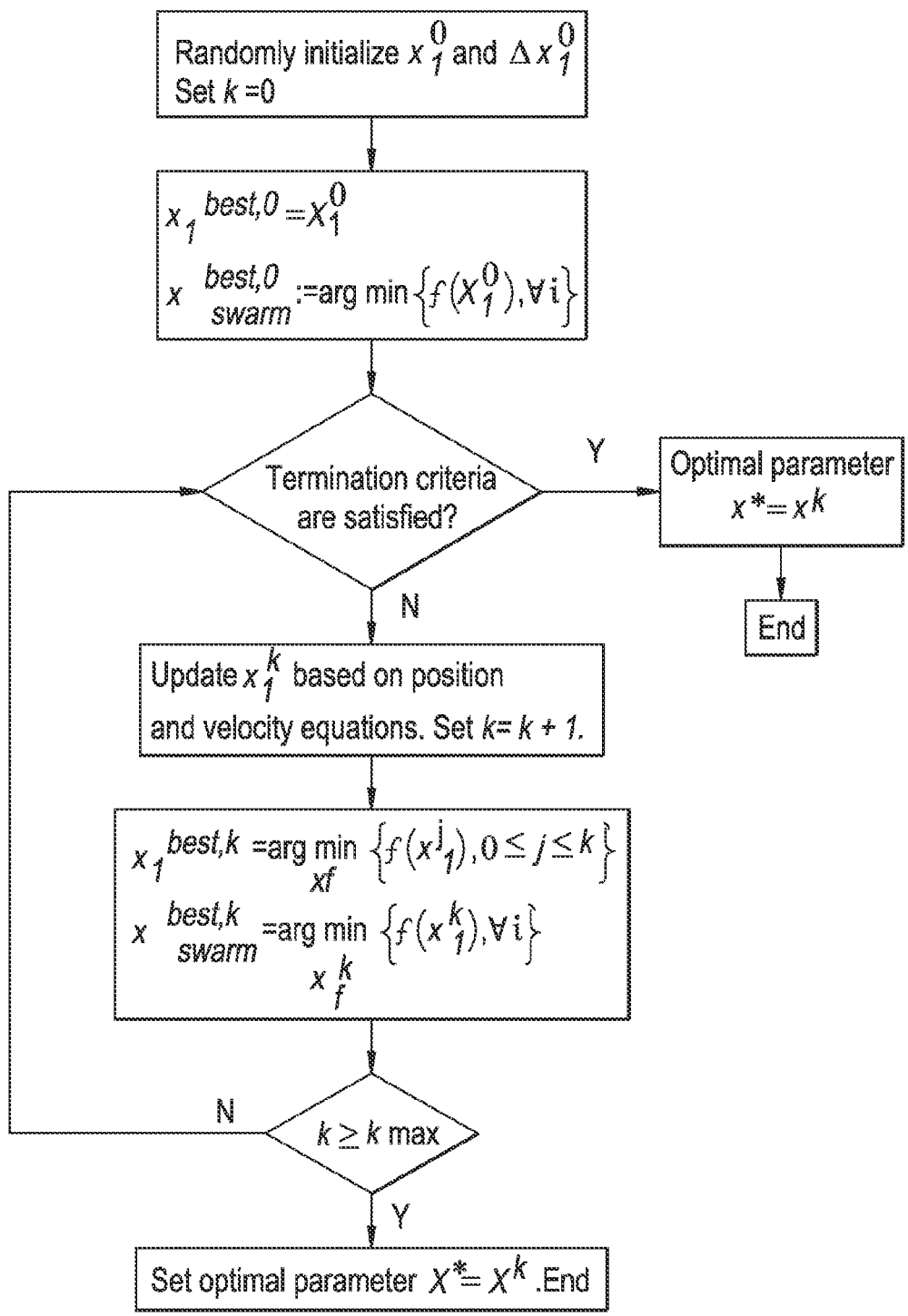
FIG. 3 is a schematic diagram of a particle swarm optimization (PSO) based automatic tuning algorithm used by the subject automatic tuning control system for air pollution control systems of FIG. 2.

Following the tuning of PID controller(s), a PSO based autotuning algorithm as set forth in FIG. 3 is applied to a supervisory MPC control layer 82 to tune MPC objective weighting constants and varying prediction and control horizons. PSO iteratively searches for the best set of values for the tuning parameters in the supervisory MPC controller layer 82 to maximize performance under certain DFGD system 10 constraints.

After separate PID and MPC tuning, tuning of an integrated DFGD MPC/PID control design is conducted to capture interaction not captured by separate PID and MPC tuning activities. The objective function is defined to incorporate the overall control performance requirements and a compromise between PID and MPC tuning performance.

Using PSO, the PID controllers and the supervisory MPC control may be simultaneously tuned to achieve improved system performance over like systems operated using manual tuning. Likewise, tuning using the PSO algorithm set forth in FIG. 3 provides the following advantages:
i) realization requires only a few lines of computer code;
ii) the PSO search technique being based on values of an objective function, makes its use relatively easy;
iii) computationally relatively inexpensive as its memory and central processing unit (CPU) speed requirements are relatively low;
iv) strong assumptions required to use conventional deterministic methods such as linearity, differentiability, convexity, separability or non-existence of constraints for efficient problem solving are not required; and
v) its solution does not depend on the initial states of particles.

In summary, the subject disclosure describes an automatic tuning control system for air pollution control systems comprising one or more, such as three, PID controls, and one or more supervisory MPC controller layers operable for control of an air pollution control system, operable for automatic tuning using particle swarm optimization through simulation using one or more dynamic models comprising ordinary and/or partial differential equations, and/or data driven regression, and/or neural networks operative to predict operational behavior of the air pollution control system, and operable for control system tuning of each PID controls, MPC controller layers and an integrated MPC/PID control design comprising an MPC controller layer operable to control emission amount and slurry level and to generate setpoints for lime slurry flow rate, dilution water flow rate, and reactor outlet temperature. As such, one PID control controls a flue gas temperature within an air pollution control system. Another PID control controls an emission amount within an air pollution control system. Still another PID control controls slurry level within an air pollution control system. Further, the supervisory MPC controller layer is operable to control each of the one or more PID controls. Automatic tuning of the subject air pollution control systems occurs with a frequency in the range of 1 second to 5 hours based on dynamic response time constants of relevant variables in the air pollution control system.

The subject disclosure likewise describes a method of using an automatic tuning control system for air pollution control systems comprising providing one or more, such as three, PID controls, and one or more supervisory MPC controller layers operable for control of an air pollution control system, operable for automatic tuning using particle swarm optimization through simulation using one or more dynamic models comprising ordinary and/or partial differential equations, and/or data driven regression, and/or neural networks operative to predict operational behavior of the air pollution control system, and operable for control system tuning of each PID controls, MPC controller layers and an integrated MPC/PID control design comprising an MPC controller layer operable to control emission amount and slurry level and to generate setpoints for lime slurry flow rate, dilution water flow rate, and reactor outlet temperature. In accordance with such method, one PID control controls a flue gas temperature within an air pollution control system. Another PID control controls an emission amount within an air pollution control system. Still another PID control controls slurry level within an air pollution control system. Further, the supervisory MPC controller layer is operable to control each of the one or more PID controls. Automatic tuning using the subject method occurs with a frequency in the range of 1 second to 5 hours based on dynamic response time constants of relevant variables in the air pollution control system.

It will be appreciated that numerous variants of the above described embodiments of the present disclosure are possible within the scope of the appended claims.

The invention claimed is:

1. An automatic tuning control system for an air pollution control system comprises:
   the air pollution control system;
   a temperature sensor arranged downstream of a reactor, an $SO_2$ sensor arranged in a filter duct, and a slurry level sensor arranged in a head tank above the reactor sensor in the air pollution control system, with each of the sensors operative to measure a system parameter to obtain a system parameter measurement;
   a proportional integral derivative (PID) control for each of the sensors operative to receive the parameter measurement, to compare the received parameter measurement to a system parameter set point, and to control an air pollution control system valve device to affect the system parameter of slurry flow to the reactor based on the temperature sensor measurement, to control an air pollution control system valve device to affect the system parameter of dilution water flow based on the $SO_2$ sensor measurement, and to control an air pollution control system valve device to affect the system parameter of slurry flow to the head tank based on the slurry level sensor measurement, with each proportional integral derivative (PID) control operable for simultaneous tuning;
   one or more supervisory multivariable predictive control (MPC) controller layers operable to control the proportional integral derivative (PID) control, with the one or more supervisory multivariable predictive control (MPC) controller layers operable for tuning following simultaneous tuning of each proportional integral derivative (PID) control; and
   an integrated MPC/PID control design comprising a multivariable predictive control (MPC) controller layer operative to generate the system parameter set point used by the proportional integral derivative (PID) control;
   wherein the automatic tuning control system is operable for automatically tuned control of the air pollution control system by tuning of the proportional integral derivative (PID) control, the one or more supervisory multivariable predictive control (MPC) controller layers and the integrated MPC/PID control design using particle swarm optimization through simulation using one or more dynamic models mathematically representing air pollution control system behavior.

2. The system according to claim 1, wherein the PID control controls a flue gas temperature within a dry flue gas desulfurization system, a wet flue gas desulfurization system, a sea water flue gas desulfurization system, a selective catalytic reduction system, a selective non-catalytic reduction system or an electro-static precipitation system air pollution control system via one or more slurry flow control valve devices.

3. The system according to claim 1, wherein the PID control controls an emission amount within a dry flue gas desulfurization system, a wet flue gas desulfurization system, a sea water flue gas desulfurization system, a selective catalytic reduction system, a selective non-catalytic reduction system or an electro-static precipitation system air pollution control system via one or more water flow control valve devices.

4. The system according to claim 1, wherein the PID control controls slurry level within a dry flue gas desulfurization system, a wet flue gas desulfurization system, a sea water flue gas desulfurization system, a selective catalytic reduction system, a selective non-catalytic reduction system, or an electro-static precipitation system air pollution control system via one or more slurry flow control valve devices.

5. The system according to claim 1, wherein the supervisory MPC controller layer is operative to calculate air pollution control system operating settings used to control each of the one or more PID controls.

6. The system according to claim 1, wherein the integrated MPC/PID control design comprising the MPC controller layer is operative to generate the system parameter set point for a slurry flow rate, a water flow rate, and a temperature used by the proportional integral derivative (PID) control.

7. The system according to claim 1, wherein the one or more dynamic models comprise ordinary and/or partial differential equations, and/or data driven regression, and/or neural networks operative to predict operational behavior of the air pollution control system.

8. The system according to claim 1, wherein automatic tuning of the air pollution control system occurs with a frequency in the range of 1 second to 5 hours based on dynamic response time constants in the air pollution control system.

9. A method of using an automatic tuning control system for control of an air pollution control system comprising:
   providing the air pollution control system;
   providing a temperature sensor arranged downstream of a reactor, an $SO_2$ sensor arranged in a filter duct, and a slurry level sensor arranged in a head tank above the reactor in the air pollution control system, with each of the sensors operative to measure a system parameter to obtain a system parameter measurement;
   providing a proportional integral derivative (PID) control for each of the sensors operative to receive the parameter measurement, to compare the received parameter measurement to a system parameter set point, and to control an air pollution control system valve device to affect the system parameter of slurry flow to the reactor based on the temperature sensor measurement, to control an air pollution control system valve device to affect the system parameter of dilution water flow based on the $SO_2$ sensor measurement, and to control an air pollution control system valve device to affect the system parameter of slurry flow to the head tank based on the slurry level sensor measurement, with each proportional integral derivative (PID) control operable for simultaneous tuning, one or more supervisory multivariable predictive control (MPC) controller layers operable to control the proportional integral derivative (PID) control with the one or more supervisory multivariable predictive control (MPC) controller layers operable for tuning following simultaneous tuning of each proportional integral derivative (PID) control, and an integrated MPC/PID control design comprising a multivariable predictive control (MPC) controller layer operative to generate the system parameter set point used by the proportional integral derivative (PID) control; and
   operating the automatic tuning control system for automatic tuning of the air pollution control system by tuning of the proportional integral derivative (PID)

control, the one or more supervisory multivariable predictive control (MPC) controller layers and the integrated MPC/PID control design using particle swarm optimization through simulation using one or more dynamic models mathematically representing air pollution control system behavior.

10. The method according to claim 9, further comprising controlling with the PID control a flue gas temperature within a dry flue gas desulfurization system, a wet flue gas desulfurization system, a sea water flue gas desulfurization system, a selective catalytic reduction system, a selective non-catalytic reduction system or an electro-static precipitation system air pollution control system via one or more slurry flow control valve devices.

11. The method according to claim 9, further comprising controlling with the PID control an emission amount within a dry flue gas desulfurization system, a wet flue gas desulfurization system, a sea water flue gas desulfurization system, a selective catalytic reduction system, a selective non-catalytic reduction system or an electro-static precipitation system air pollution control system via one or more water flow control valve devices.

12. The method according to claim 9, further comprising controlling with the PID control a slurry level within a dry flue gas desulfurization system, a wet flue gas desulfurization system, a sea water flue gas desulfurization system, a selective catalytic reduction system, a selective non-catalytic reduction system or an electrostatic precipitation system air pollution control system via one or more slurry flow control valve devices.

13. The method according to claim 9, further comprising using the supervisory MPC controller layer to calculate air pollution control system operating settings for use to control each of the one or more PID controls.

14. The method according to claim 9, wherein the integrated MPC/PID control design comprising the MPC controller layer is operative to generate the system parameter set point for a slurry flow rate, a water flow rate, and a temperature used by the proportional integral derivative (PID) control.

15. The method according to claim 9, wherein the one or more dynamic models comprise ordinary and/or partial differential equations, and/or data driven regression, and/or neural networks operative to predict operational behavior of the air pollution control system.

* * * * *